No. 695,979. Patented Mar. 25, 1902.
J. WIDMER.
PORTABLE COOKING APPARATUS.
(Application filed Oct. 14, 1901.)
(No Model.)

Witnesses:
Alfred Bosshardt
Stanley E. Bramall

Inventor:
Jakob Widmer
By F. Bosshardt.
Attorney.

UNITED STATES PATENT OFFICE.

JAKOB WIDMER, OF ZURICH, SWITZERLAND.

PORTABLE COOKING APPARATUS.

SPECIFICATION forming part of Letters Patent No. 695,979, dated March 25, 1902.

Application filed October 14, 1901. Serial No. 78,599. (No model.)

*To all whom it may concern:*

Be it known that I, JAKOB WIDMER, a citizen of the Republic of Switzerland, residing at Zurich, Switzerland, (whose post-office address is 16 Haldenbachstrasse, Zurich,) have invented new and useful Improvements in Portable Cooking Apparatus, (for which I have made application for patents in Switzerland, dated July 8, 1901, No. 27,168; in Austria, dated July 15, 1901; in Germany, dated August 12, 1901; in France, dated August 14, 1901, and in England, dated September 26, 1901, No. 19,185,) of which the following is a specification.

My invention relates to an improved construction of portable cooking apparatus principally adapted for the use of tourists and the military and which apparatus is much simpler, lighter, and takes up less room than such as hitherto in use. I attain these objects by the mechanism illustrated in the accompanying drawings, in which—

Figure 1:
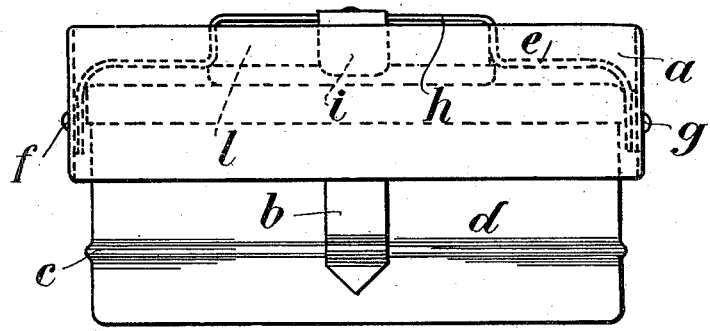
Figure 2:
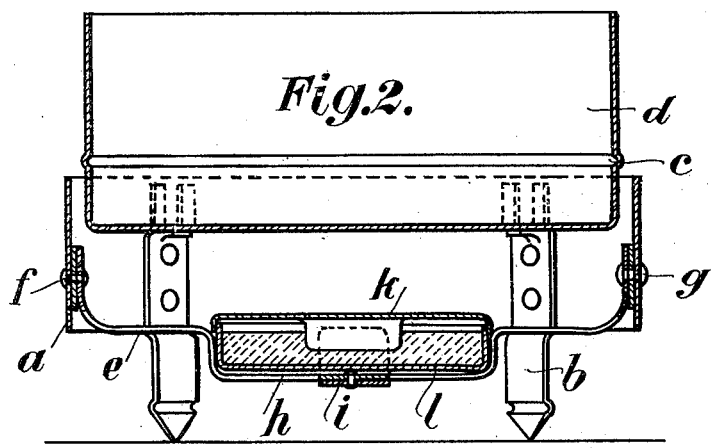
Figure 3:
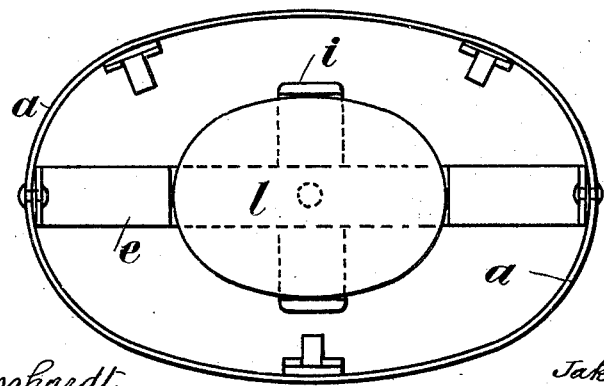

Figure 1 is an elevation of the cooking apparatus packed up ready for transport; Fig. 2, a vertical section when ready for use, and Fig. 3 a plan thereof with the cooking vessel removed.

Similar letters refer to similar parts throughout the several views.

In carrying out my invention and referring to the figures generally my improved cooking apparatus has a stand $a$, furnished with pointed feet $b$, which when the cooking apparatus is packed up for transport reach over and grip a rim $c$, formed on the cooking vessel $d$, (see Fig. 1,) and thus secure the stand $a$ to the latter. To the inside of the said stand is pivoted at $f$ a bridge $e$, having a bend $h$, furnished with arms $i$, projecting from each side upward, between which the fuel-box $l$, furnished with a lid $k$, is clamped, the said box being filled with solidified spirit or petroleum.

In packing up the cooking apparatus for transport the bridge $e$, with the box $l$, is turned upward and the stand $a$ then placed over the cooking vessel $d$, the fuel-box $l$ resting upon the latter, and the feet $b$ securing the stand $a$ to the cooking vessel $d$, as previously described.

When it is desired to use the cooking apparatus, the stand $a$ is removed from the cooking vessel $d$, the bridge $a$ turned into the position shown in Fig. 2, in which the fuel-box $l$ is between the legs $b$, the cooking vessel placed upon the stand $a$, and the lid $k$ removed from the fuel-box $l$, when the apparatus is ready for use.

What I claim as my invention, and desire to secure by Letters Patent, is—

A transportable cooking apparatus, consisting of a stand and of a cooking vessel, the former being adapted to be placed over and secured to the latter for transport and to carry a fuel-box capable of being set into use below the cooking vessel and above the same in packing up the apparatus, all substantially as and for the purpose set forth.

In witness whereof I have hereunto set my hand in presence of two witnesses.

JAKOB WIDMER.

Witnesses:
FRITZ LAUENER,
A. LIEBERKNECHT.